United States Patent
Kobayashi et al.

(10) Patent No.: US 6,358,874 B1
(45) Date of Patent: Mar. 19, 2002

(54) ZIRCONIUM CERAMIC MATERIAL, OPTICAL FIBER CONNECTOR MEMBER USING THE SAME, AND METHOD OF PRODUCING THE SAME

(75) Inventors: Yoshihiro Kobayashi; Nobuhiko Matsushita, both of Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/201,260

(22) Filed: Nov. 30, 1998

(30) Foreign Application Priority Data

Nov. 28, 1997 (JP) .......................... 09-328973

(51) Int. Cl.$^7$ ............................................ C04B 35/48
(52) U.S. Cl. ...................................... 501/105; 385/147
(58) Field of Search ........................... 385/147; 501/37, 501/105

(56) References Cited

U.S. PATENT DOCUMENTS

| | | | | |
|---|---|---|---|---|
| 4,921,328 A | * | 5/1990 | Seth | ................... 350/96.34 |
| 5,002,911 A | * | 3/1991 | Matsumoto et al. | ........ 501/105 |
| 6,087,285 A | * | 7/2000 | Oomichi et al. | ............ 501/103 |

FOREIGN PATENT DOCUMENTS

| | | | | |
|---|---|---|---|---|
| JP | 63023107 | 1/1988 | ............. | G02B/6/38 |
| JP | 5333238 | 12/1993 | ............. | G02B/6/36 |
| JP | 5333239 | 12/1993 | ............. | G02B/6/36 |

* cited by examiner

Primary Examiner—Frank G. Font
Assistant Examiner—Michael P. Stafira
(74) Attorney, Agent, or Firm—Hogan & Hartson, L.L.P.

(57) ABSTRACT

An optical connector member of the present invention is formed of a zirconia based ceramics which contain $ZrO_2$ as a main component, 2–4 mol % of $Y_2O_3$, 0.05–1.0 wt % of $Al_2O_3$, and 0.01 wt % or less each of $siO_2$ and $TiO_2$, then allowing the connector member to assure the durability even using in the high temperature and humidity circumstances. Also, An optical connector member is formed of a ceramic material having 0.1 wt % or less of a rate of change in weight while the material is held at a temperature of 85° C. and relative humidity of 85% for 2000 hours. For the ceramics, zirconia based ceramics are used to be partially stabilized with $Y_2O_3$ and with another stabilizer other than $Y_2O_3$. Further, the invention includes a ferrule having a through hole for holding an optical fiber therein, wherein the ferrule is provided, on its periphery, with a marker which indicates a direction of decentering the fiber on the top surface of the ferrule.

10 Claims, 7 Drawing Sheets

Fig.8A  Fig.8B  Fig.8C  Fig.8D
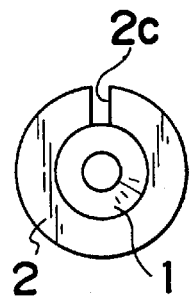 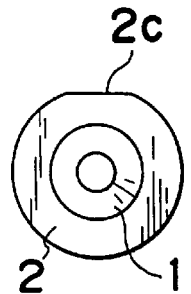 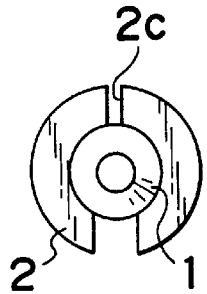 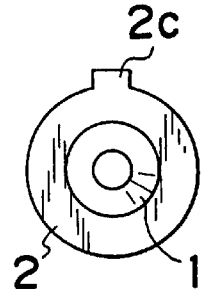
Fig.8E  Fig.8F  Fig.8G
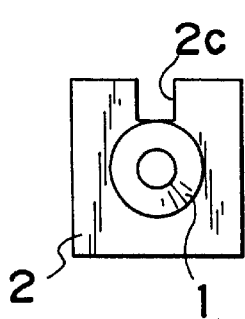 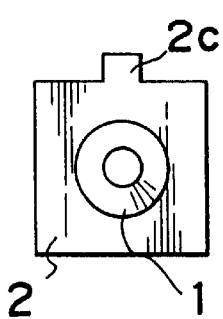 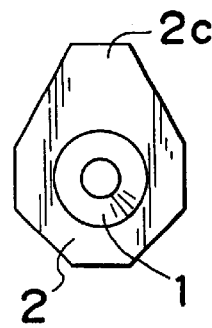
Fig.9
Prior art
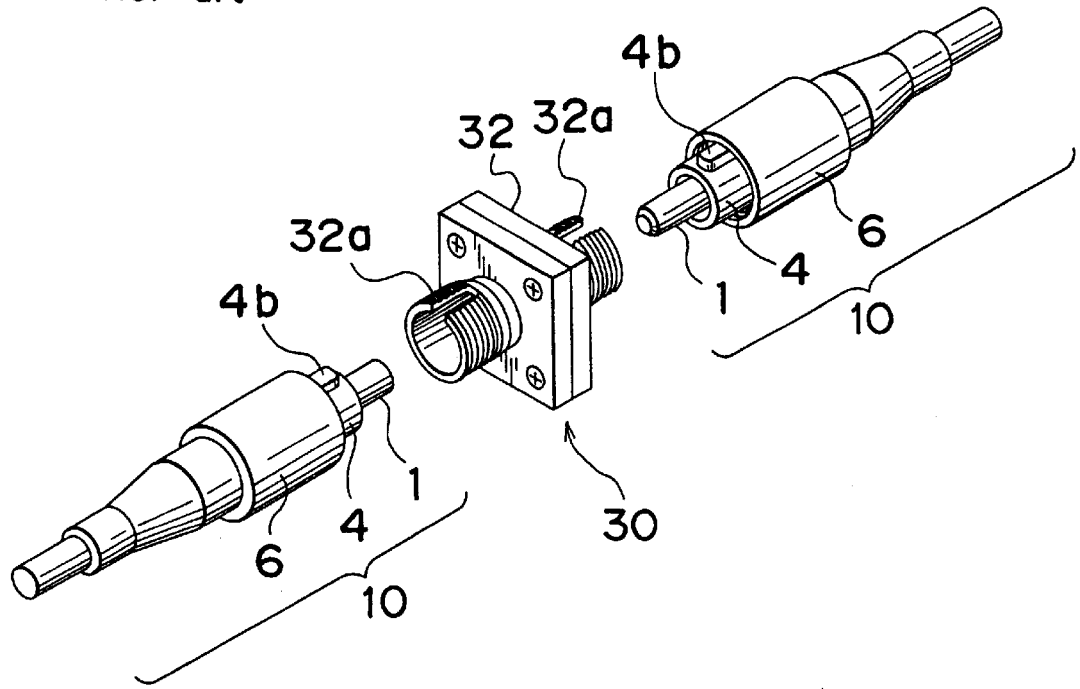

ZIRCONIUM CERAMIC MATERIAL, OPTICAL FIBER CONNECTOR MEMBER USING THE SAME, AND METHOD OF PRODUCING THE SAME

BACKGROUND OF THE INVENTION

1. Field of the Invention

The present invention relates to a ceramic material useful for optical fiber connector member, and to a optical connecting member, particularly, to a ferrule using the ceramics for holding optical fibers. The present invention relates to a method of producing zirconium ceramic material and, particularly, an optical fiber connector member using the same.

2. Prior Art

Recently, optical communication systems have been widely utilized in the world with an increase in an amount of communication. In the field of the optical communication, optical fiber connector members are used to connect one fiber to the other mechanically and optically.

For the optical connector member, as shown in FIGS. 1 and 3, a pair of ferrules 1 and 1 are used, each which has a through hole along the axis thereof, and a rear end of the ferrule is held in the backing body 2 or a flange member. Each end portion of a pair of two optical fibers to be connected is inserted through the hole and adhered to inner surface of the ferrule, of which the optical end surface is adjusted so as to form a face with together an end face of the ferrule. The end surfaces of a pair of ferrules with the fibers, as shown in FIG. 3, are abutted to each other using a appropriate casing to form an optical connector. In some cases, a ferrule is connected to another ferrule fixed to a package which contains an optical device to optically connect the fiber to the optical device.

As ferrule materials, metal, ceramics, glass, and plastics have been utilized, but the ceramics is most desirable to be used. The ceramics can be formed with high formation accuracy to precision tolerances below 1 $\mu$m of inner and outer diameters, and have low friction constant, so that the fibers may easily be inserted to and fixed in the through hole. Also, the ceramics has high hardness, high wear resistance and low heat expansion coefficient so as to be steady with regard to application of outer stress and quick change in temperature.

Ceramic material for the connectors has been replaced from conventional alumina based ceramics to zirconia based ceramics which has about one-half of the Young's modulus of alumina. As a result, the zirconia based ceramics has advantages to enhance capability of attaching the two ferrules with small applied force when they are connected in contact to each other. The Japan patent publication.JP-A 5-333238 discloses zirconia based ceramics for ferrules, which is a sintered zirconia ceramics which partially stabilized by about 3 mol % of yttria $Y_2O_3$, to increase thermal strength property.

The application ranges of the optical fiber connectors have been recently expanded so that the connectors are required to exhibit more durability for using as optical fiber connectors.

For example, optical fiber communication lines, including such optical fiber connectors, have been located for a long time in severe circumstances at high temperature and humidity, such as in deserts or abysses. In these cases, it requires that the materials for the connectors do not decrease in connecting properties even over time without being exchanged, and is usable in a longtime steady state.

However, $Y_2O_3$-partially stabilized zirconia based ceramics as mentioned above have a problem of reducing its properties while exposed in high temperature and humidity circumstances by transform its tetragonal crystal to monoclinic crystal. In the case of ferrules using such zirconia ceramics, the roughening and deformation are apt to occur on the ferrule surface while they are being held in the hot and wet circumstances, then causing loss of light transmitting through the fibers with connecting defect to the ferrules. It has been understood that these surface defects are due to transformation of the ceramic crystal to monoclinic system and to hydration of the surface layers in high temperature and humidity, then to expand the ferrule tube.

Furthermore, ferrules comprising zirconia ceramics often show black flecks of 1 to 5 $\mu$m in size on their surfaces.

For the optical connector devise, a plug is composed from a ferrule which provided with a backing body or a flange 2 on the outer periphery and a fiber in the through hole, composes a plug. Actually, as shown in FIGS. 9 and 10, the two plugs to be connected are inserted in a adapter 32 like a sleeve from both the sides and connected by abutting the optical end surfaces of the fibers in the ferrules of the plugs. Then, the light signal information transfers from the one fiber to the other through the connector.

The ferrule is fabricated so accurately that the center of the hole desired to be located in the center of the ferrule, but it is difficult to center the fiber to the ferrule and to avoid decentering below 1.4 $\mu$m between the axes of the fiber and ferrule.

It has been observed that there often is of local difference between centers of a ferrule and a through hole which is bored in the ferrule. This axial divergence causes a loss of light transmission when the light is passed through to the connected fiber ways. Even If the fiber decenters in the ferrule, the two fibers in the ferrules can be aligned to adjust the decentering directions of each fiber on the end surface, allowing the connector to reduce in light transmission loss.

For this purpose, for example, as shown in FIGS. 13A and 13B, a ferrule 1 is formed with four lateral grooves 2c on an outer periphery of its flange 2 at a mutual angle of 90° to the axis, and, on the other hand, the plug housing 4 is formed with four corresponding projections 4a on its inner periphery, which can be engaged to the grooves 2c by rotating the ferrule by said angle 90° to the plug housing 4. In such conventional structure of the connector, the ferrule is rotated at every angle of 90°, while the loss of the light of the connector is being measured, and then at a rotating position to attain a minimum loss, the ferrule is attached to the plug housing 4, thus, performing a optical connector.

However, rotation of the ferrule and measurement of light loss are required at least five times to find out the most appropriate rotating position between the ferrule and the plug housing, so that one has much trouble in the operation needed. Further, the rotating of the ferrule was limited to angle intervals of 90°, not continuous, and therefore the ferrule could not be adjusted to the most appropriate position for really minimum loss of light transmission.

SUMMARY OF THE INVENTION

An object of the present invention is to provide zirconia based ceramic material having longer duration without reducing in thermal and mechanical property in high temperature and humidity circumstances.

Another object of the present invention is to provide a optical fiber connector member for connecting the optical fibers usable in high temperature and humidity circumstances for a long time.

Another object of the present invention is to provide a ferrule and a sleeve thereof used as the optical connector member in high temperature and humidity circumstances over a long period.

Another object of the present invention is to provide a ferrule to be adjustable to the most appropriate position for really minimum loss of light transmission.

Another object of the present invention is to provide a ferrule to be adjusted to the most appropriate position by easier operation for fabricating an optical connector member.

A zirconia based ceramic material of the present invention is stabilized by $Y_2O_3$, and is limited to an extremely small amount of impurities causing the phase transformation and/or hydration of the ceramics, then, to prevent degradation thereof. To this end, amounts of $SiO_2$ and $TiO_2$ in the ceramics should be reduced to a very low level.

A zirconia based ceramic material of the present invention dose not contain $Y_2O_3$ substantially but partially stabilized by metal oxide stabilizers other than $Y_2O_3$. In the present invention, degradation due to $Y_2O_3$ in the ceramics exposed in such hot and wet circumstances can be effectively prevented.

The ceramics material is used for an optical fiber connector member, including ferrule and sleeve.

The present invention includes the ceramics whose weight increases only slightly while the ceramics being held in high temperature and humidity circumstances over a long period.

Further, the present invention provides proper configuration of ferrules to make the connection between the ferrules easy. Such ferrules have a marker which indicates eccentric direction of a through hole on the top end surface of the ferrule, and the marker is usually formed on the outer periphery of the ferrule.

The ferrule of the present invention is formed with a marker on any periphery of the ferrule which indicates a direction of decentering a through hole on the top end surface.

The ferrule of the present invention may be provided with a flange member, and the marker is formed on any periphery of the ferrule and/or the flange member.

The present invention provides a optical fiber connector comprising a ferrule with a through hole in which a optical fiber is inserted and fixed, a plug housing fixed on the periphery of the ferrule, wherein the marker may be formed on any periphery of the plug housing.

For a optical fiber connector, a pair of ferrules are abutted on the top ends in contact to each other, and adjusted such as match the two marks close to each other, then obtaining minimum loss of the light transmission across the connection.

BRIEF DESCRIPTION OF THE DRAWINGS

The present invention is described in further detail below with reference to the accompanying drawings, in which;

FIGS. 8A–8G show top end views of the ferrule with a flange member attached, on which a marker is applied, according to the another embodiment;

FIG. 9 shows a perspective view of a conventional optical fiber connector device;

DETAILED DESCRIPTION OF THE PREFERRED EMBODIMENTS

Embodiment 1

Figure 1:
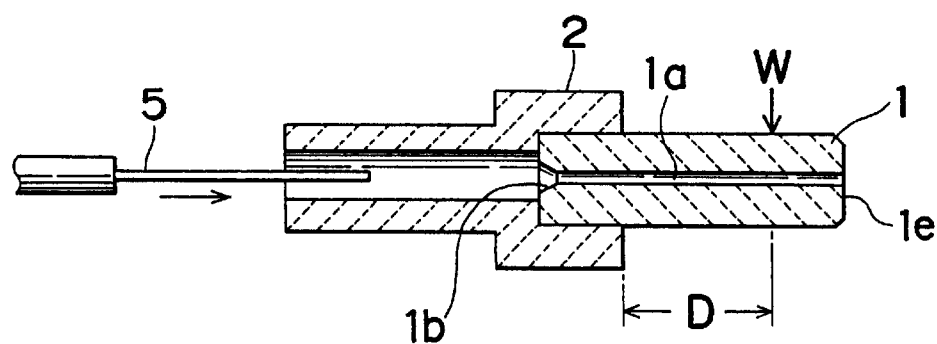
FIG. 1 shows a sectional view of a ferrule using for a fiber connector in an embodiment of the present invention.

In this embodiment, a zirconia based ceramics contains $Zro_2$ as a main component, 2–4 mol % of $Y_2O_3$, 0.05–1.0 wt % of $Al_2O_3$, 0.01 wt % or less each of $siO_2$ and $TiO_2$.

In the zirconia based ceramics, 2–4 mol % of $Y_2O_3$ in the ceramics stabilizes the $ZrO_2$ crystal structure to be kept tetragonal, which is thermally stable, enhancing the long-term duration in a high temperature.

$siO_2$ and $TiO_2$ in the ceramics forms glass phase in the boundary layers between the zirconia crystal grains of the ceramics during sintering, to dissolve part of $ZrO_2$ component into the glass phase into segregation, then resulting in deteriorating the ceramics in use in above circumstances. Even any of $SiO_2$ and $TiO_2$ over 0.01 wt % can produce such glass phase. Therefore, each content of $SiO_2$ and $TiO_2$ in the sintered material should be limited to a level of 0.01 wt % or less, to avoid such degradation.

0.05–1.0 wt % of $Al_2O_3$ is used as a sintering agent, to promote the sintering rate, but excess of 1.0 wt % of $Al_2O_3$ is apt to oversinter the ceramics.

Other impurities in the ceramics may be decreased at a low level as far as possible. Such impurities as CaO, $Na_2O$ and $Fe_2O_3$ are apt to form the glass phase in the grain boundary and then should be limited to be a lower level than 0.1 wt %, respectively.

The present invention includes a method of producing such zirconia based ceramics. The method comprises steps preparing the starting material mixture comprising $ZrO_2$ as a main component, 2–4 mol % of $Y_2O_3$, 0.05–1.0 wt % of $Al_2O_3$, 0.01 wt % or less each of $siO_2$ and $TiO_2$, pressing the mixture to a compact in a desired shape, firing the compact at a sintering temperature in a range of 1300 to 1600° C. into a sintered body.

The sintered material may preferably be formed with tetragonal crystals having mean grain size of 2 μm or less.

The sintered material produced in this manner, without $Y_2O_3$ segregating in the zirconia matrix, causes the tetragonal crystal grains to distribute uniformly in the material, then, having high durability even in the hot and wet circumstances. Even though the material is soaked for a long time in hot water of about 85° C., for example, the material cannot be subjected to the surface defects as above mentioned, so that it is desirable to be used in the optical connector member.

An optical connector member in the present invention is formed of zirconia based ceramics containing $ZrO_2$ as a main component, 2–4 mol % of $Y_2O_3$, 0.05–1.0 wt % of $Al_2O_3$, 0.01 wt % or less each of $SiO_2$ and $TiO_2$.

The optical connector member includes a member of connecting between two optical fibers, and a member of connecting an optical fiber to various kind of optical device. The optical connector member includes a ferrule, sleeve and the like.

Example

Zirconia, yttria and alumina were prepared as starting materials for producing sintered ceramics, which contained various amounts of impurities including $SiO_2$ and $TiO_2$ by varying conditions of acid treatment to each starting material. The staring materials were provided to form sintering mixtures having different predetermined compositions.

Tubes of 2.5 mm in diameter and 10.5 mm long were extruded from the stating mixtures and fired at 1435° C. to obtain ferrules in a shape as shown in FIG. 1

20 samples for a kind of ferrule each ceramic composition were connected with optical fibers each which was inserted into the through hole, and ground on their end surfaces. The ferrule samples were soaked in hot water kept at 85° C. for 14 days. Thereafter, each ferrule sample was observed on the end surface in optical microscopy to search roughness and deformation of the end surfaces and analyzed by X-ray diffraction technique to determine fractions of tetragonal and monoclinic crystals in the ceramic matrix.

Table 1 shows the experimental results including the number of degraded ferrules each composition, where the ferrules having roughness and deformation and the monoclinic crystal fraction greater than 50% were considered to be degraded.

TABLE 1

| sample No. | chemical composition (wt %) | | | | | | | Number of degraded samples | weight change rate (%) |
| --- | --- | --- | --- | --- | --- | --- | --- | --- | --- |
| | $Y_2O_3$ | $TiO_2$ | $SiO_2$ | $Al_2O_3$ | CaO | $Na_2O$ | $Fe_2O_3$ | | |
| *1 | 3.2 | 0.01 | 0.01 | 0.04 | 0.02 | 0.01 | 0.01 | 2/20 | 0.124 |
| 2 | 2.6 | 0.01 | 0.01 | 0.06 | 0.02 | 0.02 | 0.01 | 0/20 | 0.024 |
| 3 | 3.0 | 0.01 | 0.01 | 0.95 | 0.03 | 0.01 | 0.01 | 0/20 | 0.013 |
| *4 | 3.3 | 0.01 | 0.01 | 1.15 | 0.02 | 0.01 | 0.01 | 5/20 | 0.186 |
| *5 | 3.1 | 0.01 | 0.09 | 0.04 | 0.01 | 0.02 | 0.01 | 4/20 | 0.173 |
| 6 | 2.8 | 0.01 | 0.09 | 0.06 | 0.01 | 0.02 | 0.01 | 0/20 | 0.015 |
| 7 | 3.4 | 0.01 | 0.09 | 0.95 | 0.01 | 0.01 | 0.01 | 0/20 | 0.032 |
| *8 | 3.0 | 0.01 | 0.09 | 1.15 | 0.02 | 0.01 | 0.01 | 6/20 | 0.205 |
| *9 | 2.5 | 0.01 | 0.11 | 0.04 | 0.02 | 0.01 | 0.01 | 6/20 | 0.213 |
| *10 | 2.9 | 0.01 | 0.11 | 0.06 | 0.02 | 0.01 | 0.02 | 2/20 | 0.120 |
| *11 | 3.3 | 0.01 | 0.11 | 0.95 | 0.01 | 0.01 | 0.01 | 2/20 | 0.118 |
| *12 | 3.1 | 0.09 | 0.11 | 1.15 | 0.02 | 0.01 | 0.01 | 6/20 | 0.223 |
| *13 | 3.1 | 0.09 | 0.01 | 0.04 | 0.01 | 0.02 | 0.01 | 3/20 | 0.154 |
| 14 | 2.8 | 0.09 | 0.01 | 0.06 | 0.01 | 0.02 | 0.01 | 0/20 | 0.026 |
| 15 | 3.4 | 0.09 | 0.01 | 0.95 | 0.01 | 0.01 | 0.01 | 0/20 | 0.038 |
| *16 | 3.0 | 0.09 | 0.01 | 1.15 | 0.02 | 0.01 | 0.01 | 6/20 | 0.218 |
| *17 | 2.5 | 0.09 | 0.09 | 0.04 | 0.02 | 0.01 | 0.01 | 5/20 | 0.173 |
| 18 | 2.9 | 0.09 | 0.09 | 0.06 | 0.02 | 0.01 | 0.01 | 0/20 | 0.024 |
| 19 | 3.2 | 0.09 | 0.09 | 0.95 | 0.02 | 0.01 | 0.01 | 0/20 | 0.038 |
| *20 | 2.6 | 0.09 | 0.09 | 1.15 | 0.02 | 0.02 | 0.01 | 7/20 | 0.220 |
| *21 | 3.0 | 0.09 | 0.11 | 0.04 | 0.03 | 0.01 | 0.01 | 7/20 | 0.200 |
| *22 | 3.3 | 0.09 | 0.11 | 0.06 | 0.02 | 0.01 | 0.01 | 3/20 | 0.138 |
| *23 | 3.1 | 0.09 | 0.11 | 0.95 | 0.01 | 0.02 | 0.01 | 3/20 | 0.152 |
| *24 | 2.8 | 0.09 | 0.11 | 1.15 | 0.01 | 0.02 | 0.01 | 9/20 | 0.318 |
| *25 | 3.4 | 0.11 | 0.01 | 0.04 | 0.01 | 0.01 | 0.01 | 5/20 | 0.168 |
| *26 | 3.0 | 0.11 | 0.01 | 0.06 | 0.02 | 0.01 | 0.01 | 2/20 | 0.120 |
| *27 | 2.5 | 0.11 | 0.01 | 0.95 | 0.02 | 0.01 | 0.01 | 3/20 | 0.48 |
| *28 | 2.9 | 0.11 | 0.01 | 1.15 | 0.02 | 0.01 | 0.01 | 7/20 | 0.219 |
| *29 | 2.9 | 0.11 | 0.09 | 0.04 | 0.01 | 0.01 | 0.02 | 6/20 | 0.217 |
| *30 | 3.3 | 0.11 | 0.09 | 0.06 | 0.02 | 0.01 | 0.01 | 3/20 | 0.121 |
| *31 | 3.1 | 0.11 | 0.09 | 0.95 | 0.01 | 0.02 | 0.01 | 4/20 | 0.176 |
| *32 | 2.8 | 0.11 | 0.09 | 1.15 | 0.01 | 0.02 | 0.01 | 8/20 | 0.223 |
| *33 | 3.4 | 0.11 | 0.11 | 0.04 | 0.01 | 0.01 | 0.01 | 10/20 | 0.315 |
| *34 | 3.0 | 0.11 | 0.11 | 0.06 | 0.02 | 0.01 | 0.01 | 4/20 | 0.170 |
| *35 | 2.5 | 0.11 | 0.11 | 0.95 | 0.02 | 0.01 | 0.01 | 5/20 | 0.168 |
| *36 | 2.9 | 0.11 | 0.11 | 1.15 | 0.03 | 0.01 | 0.01 | 12/20 | 0.353 |

*outside the scope of the invention

In Table 1, no degradation was observed on the end faces of the ferrule samples including 0.1 wt % or less each of $SiO_2$ and $TiO_2$ and 0.05–1.0 wt % of $Al_2O_3$, within the scope of the present invention. On the other hand, the ferrules including any one of $SiO_2$ and $TiO_2$ in a amount of more than 0.1 wt % showed such degradation in ratios of 2–10 to 20 samples. Other samples without the range of 0.05–1.0 wt % of $Al_2O_3$ were observed to be degraded in ratios of 2–7 to 20 samples.

Thus, since the ceramics materials of the present invention are excellent in durability at a high temperature and humidity, they are useful not only for optical connector devices but for medical and dental implant members, mechanical components such as pump members and for wide variety of industries.

Embodiment 2

In this embodiment of the present invention, an optical connector member is provided for connecting the end portions of optical fibers, which is formed of ceramics, having 0.1 wt % or less of a rate of change in weight while the ceramics is held at a temperature of 85° C. and a humidity of 85% for 2000 hours.

It has been found that durability of ceramic material to be used in hot and wet circumstances has a close relation to the change rate of its weight during the holding of the ceramics under above-mentioned condition for a shortened test time.

The ferrule with the weight change rate lowered under such testing condition may desirably be used for optical connector members, particularly, ferrules and sleeves using for such optical connecting devices as exposed in hot and moist circumstances.

Such ceramics in this embodiment mean all material obtainable by treating non-organic substances at a high temperature, particularly may include sintered or melted ceramics, single crystals, glasses and their composites.

Particularly, zirconia based ceramics stabilized by a stabilizing agent other than yttria, without substantially including yttria, may be used to form ferrules.

Also, zirconia based ceramics stabilized by yttria having the compositions as mentioned above, may be used to form ferrules.

Figure 2A:
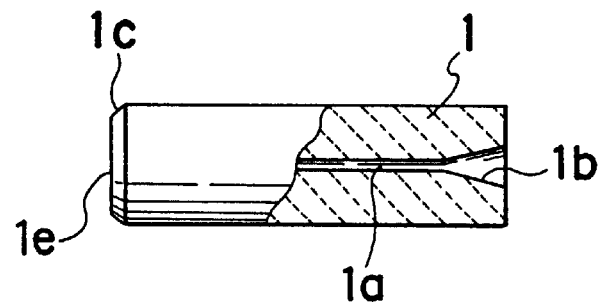
FIG. 2A shows a partial sectional view of a ferrule in an embodiment of the present invention.
Figure 2B:
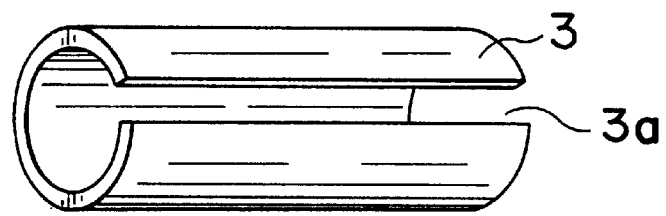
FIG. 2b shows a side view of a sleeve for covering the two ferrules in an embodiment of the present invention.
Figure 3:
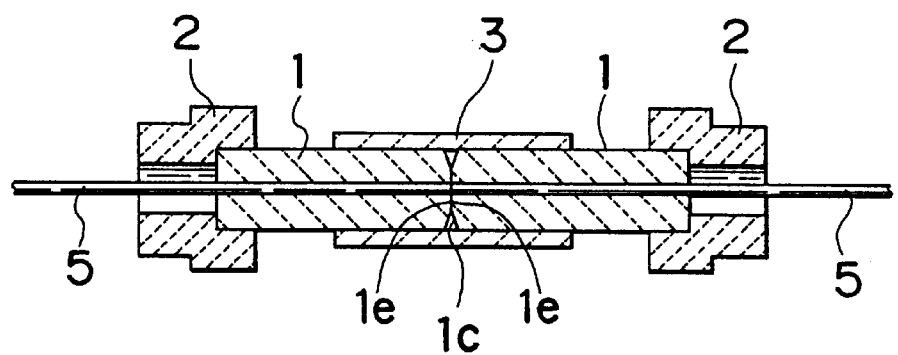
FIG. 3 shows a sectional view of an optical fiber connector fabricated for connecting a pair of fibers in an embodiment of the present invention.

An optical connector member as shown in FIG. 3, comprises two ferrules 1 and 1 which are abutted each other at the top ends for holding each end of two optical fibers 4 and 4, a sleeve 3 through which the ferrules are passed aligned and two backing body 2 and 2 such as flange member for pushing the two ferrules 1 and 1 each other forward to fix them. The ferrule 1 is a tube having a through hole 1a along the axis to center the fiber 5, and a coned opening 1b at the end of the hole 1a to easily insert the fiber, a spherical contact surface 1c at the opposite end to contact with each other. As shown in FIG. 2B, the sleeve 2 is a tubular body having a hollow, in which the abutted ferrule are inserted and fixed. For the sleeve, a slot 2a may be shaped by cutting the thin wall of the body longitudinal, to easy insert the ferrules. Further, three small projections (not shown) may be formed inside the wall of the sleeve to support the outer periphery of the ferrules.

The ferrule 1 made of the above ceramics is joined to the metal backing body 3, and an optical fiber 5 is inserted through the through hole 1a from the cone opening side, and the end surface 1d of the ferrule 1 is polished together with the end 1d of the fiber 5 into a spherical convex and concave with a diameter of 10–25 mm. A pair of ferrules are inserted in a sleeve to abut the convex and concave end surfaces of the ferrules in the hollow, and are enforced with springs between the metal backing body 3 and 3, then, completing a optical connector.

Conventionally, the zirconia ceramics partially-stabilized by yttria is apt to be transformed from the tetragonal to monoclinic system in a hot and wet circumstances, and hydrated with reaction to water to expand and also to increase in weight, then hydration of the surface layer causing the surface roughness and deformation of the surface.

Some materials which has porosity in ceramics or hygroscopicity in plastics tend to vary in weight due to impregnating water while being exposed in such a circumstances. In the materials having a tendency to impregnate water, the water containing in the material is attached to the fiber to lower its strength, and in the extreme event, to break the fiber.

In the present invention, by measuring the change in weight between before and after the material is held in the hot and wet conditions, it is possible to determine whether it has any hydrated layer on the surface, and whether it has absorbed water. This is very useful to evaluate the durability of the materials in advance for the applications. Further, Use of ceramic material which have 0.1 wt % or less of a rate of change in weight under above-mentioned testing conditions can be effective to assure durability of the optical fiber connector members to be used in the hot and wet circumstances.

The ceramics in the embodiment of the present invention includes Zirconia based ceramics which is stabilized by MgO, $CeO_2$, $Dy_2O_3$, or CaO or these two or more oxides as stabilizing agent, without substantially containing $Y_2O_3$. The zirconia based ceramics containing the stabilizing agent except $Y_2O_3$ are hardly hydrated on the surfaces and can be superior in durability in the high temperature and humidity circumstances.

MgO and $CeO_2$—$Dy_2O_3$ are preferably adopted as stabilizing agent for the zirconia based ceramics. Particularly, such sintered ceramic material may comprise MgO in a amount of 3.0–3.8 wt %, and $ZrO_2$ as a main component, and contain 10–40 mol % of monoclinic zirconia crystal. This ceramic material is high in heat resistance, having higher transverse rupture strength than 7000 kg/cm$^2$, higher fracture toughness KiC than 11 MPa√m and higher heat-shock resistance ΔT than 400° C.

Furthermore, another sintered ceramics in the embodiment may comprise 0.5–4.5 mol % of $Dy_2O_3$ and 2–8 mol % of $CeO_2$ and $ZrO_2$ as a main component, and contain 50 mol % or less of monoclinic zirconia crystal. This ceramics material can have not only higher transverse rupture strength than 5500 kg/cm$^2$ but also high heat resistance and water resistance, so that it can be avoided from deteriorating even in the high temperature and humidity circumstances.

Also, The ceramics includes a zirconia based ceramics stabilized by $Y_2O_3$ as mentioned above in the first embodiment, containing $ZrO_2$ as a main component, 2–4 mol % of $Y_2O_3$ as stabilizer, 0.05–1.0 wt % of $Al_2O_3$, 0.01 wt % or less each of $siO_2$ and $TiO_2$. In the ceramics, 2–4 mol % of $Y_2O_3$ stabilize the $ZrO_2$ crystal structure to be kept tetragonal, which is thermally stable, enhancing the long-term duration in a high temperature. The ceramics may have a structure of mean grain size of 2 μm or less and a crystal fraction of 40 mol % or less of monoclinic crystal.

For another ceramics, $Al_2O_3$ based ceramics, $ZrO_2$ based ceramics, $ZrO_2$ dispersed $Al_2O_3$ based ceramics or $Al_2B_2O_3$ containing $Al_2O_3$ based ceramics may be used. The $ZrO_2$ dispersed $Al_2O_3$ based ceramics is formed to disperse a predetermined amount of $ZrO_2$ in the ceramics, then, to prevent cracks present as rupture sources in the ceramics from developing to rupture, thereby increasing the strength. Particularly, the $ZrO_2$ dispersed zirconia based ceramics may be used, in which the micro-particles of nano-meter level size of the zirconia are dispersed in grain boundaries of alumina structure to enhance strength of the boundary.

The ceramics may be selected from the silicon carbide, silicon nitride, aluminum nitride, steatite, titania, forsterite, cordierite and mulite, and sapphire as single crystal of alumina.

Sintered composites comprising ceramics components and metal components may be used. For example, the ceramics components may include alumina, silicon carbide or silicon nitride, and the metal components may include aluminum alloys. As an example, a composite material of silicon carbide and aluminum alloy may be formed by steps of preparing a SiC—gel $SiO_2$ mixture, pressing the mixture to compacts in a desired shape, then firing the compacts at 800° C. to be sintered, and impregnating molten aluminum to the sintered ceramic body using a pressure-casting technique.

Glass ceramics may also be used for the optical connector members, including borosilicate glass and crystallized glass. The crystallized glass may be formed by crystallizing $Li_2O$—$Al_2O_3$—$SiO_2$ system glass.

The ceramic composite can be provided with some properties which cannot be obtained from only each component material to compose the composite, which usually comprises a matrix material and any of dispersing or reinforcing agent. For example, the above-mentioned ceramics may be used as a matrix material and the dispersing or reinforcing agent such as other ceramics, metals, is added to the matrix. Alternatively, the above-mentioned ceramics may be used as the dispersing or reinforcing agent to be added in a matrix of said other ceramics or metals, or resin.

The ceramics mentioned above may be easily obtained by adjusting its composition, crystal structure, grain size and porosity so as to meet the change rate of 0.1 % or less in weight under above defined conditions.

In a method of producing ferrules for optical connector members, tubes with a through hole are formed by extruding or injection molding a slip of the material powder which is prepared in the above composition, and fired at a predetermined temperature to obtain sintered tubes. The peripheral and the hole of each tube are machined to obtain a ferrule with the desired dimensions by grinding and polishing. One top end le of the tube may be machined in a sphere with a chamfer at the edge and other end may be machined to form a chamfer or cone at the opening of the through hole.

The material for the ferrule may preferably have hardness enough to avoid the ferrule from breaking while fabricating or using it. When the ferrule is protected by a backing body, as shown in FIG. 1, from which an end portion of the ferrule projects, the ferrule is desirable to bear the weight W of 3.5 kg or more which is loaded perpendicular to its axis on the ferrule at a distance of 6.5 mm from its top end. The bending strength σ to be required for the ceramic material is defined as follows;

$$\sigma \geq M/Z = W \times 6.5/(\pi d^3/32) = i483 \text{ kg/cm}^2$$

where diameter d of a ferrule is 2.5 mm, moment M and sectional area coefficient Z. Therefore, ferrules may be formed of the ceramics having the bending strength of 1500 kg/cm².

Example

Ferrules were formed of various materials, as shown in FIG. 2B, having dimensions of 10.5 mm long, 2.5 mm in outer diameter and a through hole with 0.126 mm in inner diameter. 20 samples of each material were prepared and made dry to be kept in a incubator at the temperature of 45° C. for 2 hours, then, weighed to obtain a weight before testing by a chemical balance (accuracy ±0.05 mg).

The samples were held at 85° C. and relative humidity of 85% for 2000 hours in an incubator, then weighed in the same manner to obtain the weight after testing.

The rate of change in weight was calculated from the measured weights before and after testing. The result is shown in Table 2.

$Y_2O_3$ stabilized zirconia (Sample No. 1) shows a large weight change rate of 0.138 wt %, due to a hydrated layer on the surface. Cordierite and mulite ceramics (Sample Nos. 15 and 25) are very high in weight change rate due to large porosity. It is necessary to decrease the porosity of the ceramics into 0.1% or less, in order to decrease the change rate below 0.1 wt %. However, the other ceramics can be made low in a weight change rate to 0.1% or less.

TABLE 2

| | | weight change (mg) | | | rate |
|---|---|---|---|---|---|
| No. | Material | before | after | differ. | (wt %) |
| *1 | $Y_2O_3$ zirconia | 304.31 | 304.73 | 0.42 | 0.138 |
| 2 | Dy—Ce zirconia | 294.21 | 294.28 | 0.07 | 0.024 |
| 3 | MgO zirconia | 289.12 | 289.18 | 0.06 | 0.021 |
| 4 | CaO zirconia | 294.36 | 294.30 | −0.06 | −0.020 |
| 5 | Alumina (Purity 99.7%) | 197.85 | 197.89 | 0.04 | 0.020 |
| 6 | Alumina (Purity 99.0%) | 197.73 | 197.78 | 0.05 | 0.025 |
| 7 | Alumina (Purity 96%) | 194.56 | 194.64 | 0.08 | 0.041 |
| 8 | Alumin + ziO2 5 mol % | 208.45 | 208.49 | 0.04 | 0.019 |
| 9 | Alumin + ziO2 20 mol % | 223.75 | 223.71 | −0.04 | −0.018 |
| 10 | Alumin + ziO2 2.5 mol % nano sructure | 205.82 | 205.89 | 0.06 | 0.029 |
| 11 | Alumina + Al2b2O9 | 167.42 | 167.47 | 0.05 | 0.030 |
| 12 | Steatite | 143.36 | 143.36 | 0 | 0 |
| 13 | Titania | 204.80 | 204.72 | −0.08 | −0.039 |
| 14 | Sapphire | 203.64 | 203.59 | −0.08 | −0.025 |
| *15 | Cordierite | 76.80 | 97.38 | 20.58 | 26.79 |
| 16 | Forsterite | 153.62 | 153.67 | 0.05 | 0.033 |
| 17 | Silicon carbide | 163.89 | 163.94 | 0.05 | 0.031 |
| 18 | Silicon Nitride | 163.53 | 163.49 | −0.04 | −0.024 |
| 19 | Aluminum nitride | 174.08 | 174.13 | 0.05 | 0.029 |
| 20 | Cermet | 304.38 | 304.32 | −0.06 | −0.020 |
| 21 | Borosilicate glass | 120.83 | 120.82 | −0.01 | 0.008 |
| 22 | crystalized glass | 128.51 | 128.53 | 0.02 | 0.016 |
| 23 | SiC—Al Composite | 158.75 | 158.78 | 0.03 | 0.019 |
| 24 | Mulite | 102.43 | 109.95 | 7.52 | 7.34 |
| *25 | PBT resin | 77.83 | 77.90 | 0.07 | 0.089 |
| *26 | PEI resin | 68.61 | 68.80 | 0.19 | 0.277 |

*outside the present invention

Next, 20 sampled were produced by inserting an optical fiber through the ferruls and pressing the ferrule into the backing body, and kept in a were held at 85° C. and relative humidity of 85% for 2000 hours in a incubator. The samples then were measured in actinograghy to obtain the optical losses in connecting the fibers. The data of optical loss change rates were listed in Table 3.

TABLE 3

| | | connecting loss (dB) | |
|---|---|---|---|
| No. | material | before testing | after testing |
| 1 | $Y_2O_3$ Zirconia | 0.18 | 0.43 |
| 15 | Cordierite | 0.19 | broken |
| 24 | Mulite | 0.22 | broken |
| 25 | PBT resin | 0.17 | broken |
| 26 | PEI resin | 0.19 | broken |
| | average otherwise | 0.21 | 0.23 |

The samples with 0.1 or less of the weight change cannot almost produce the optical loss, and are assured high useful durability even in use in a high temperature and humidity circumstances. However, the Samples Nos. 1, 15, and 24–26 are apt to increase in optical loss or be broken when the rate of change in weight exceeds 0.1 wt % during the test as shown in Table 4. Therefore, The materials which are formed in the condition that the weight change rate is 0.1 wt % or less during testing for 2000 hours at a temperature of at 85° C. and relative humidity of 85%, can increase the durability of ferrules which is used in a hot and wet circumstances.

Embodiment 3

This embodiment concerns the configuration of an optical fiber connector and a ferrule desirable to be used therefor, in order to minimize loss of light transmission through the connector.

In this embodiment, an optical fiber connector comprises a pair of ferrules each which is provided with a through hole, a pair of optical fibers each which is fixed in the hole of the ferrule and a plug housing, namely, a sleeve mentioned above in which the ferrules are inserted and fixed.

The ferrule or the plug housing is formed with a marker on any periphery thereof which indicates a direction of decentering a through hole on the top end surface of the ferrule.

The ferrule may be provided with a flange member, and in this case the marker is formed on any periphery of the ferrule or the flange member.

In fabricating an optical fiber connector, a pair of ferrules are abutted on the top ends in contact to each other, inside the sleeve and adjusted so as to match the two markers close to each other, then obtaining minimum loss of the light transmission through the optical fiber connector.

The marker is formed on some periphery of the ferrule to indicate a direction of decentering a through hole on the top end surface of the ferrule. The direction of decentering a through hole means a direction from the surface center of the ferrule to the center point of the through hole opening on the top end surface or the center of the fiber end surface thereon. The marker is defined as being formed on the elongated line from the center point of the hole or fiber toward said direction. Alternatively, a marker may be defined as being formed on the diametrically opposed side of the direction.

A direction of the marker from the center of the ferrule may be deviated within ±30° from the above direction of decentering a through hole. It is found that if the marker is formed in the deviated direction within ±30° from said decentering direction, the light transmission loss can be lowered sufficiently by abutting the ferrules according to the two markers.

Figure 4A:
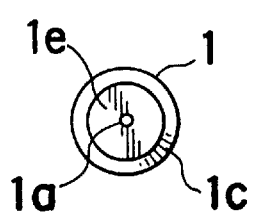
FIGS. 4A and 4B are a top view and partially sectional view, respectively, of a ferrule with a marker applied on a side surface according to another embodiment of the present invention.
Figure 4B:
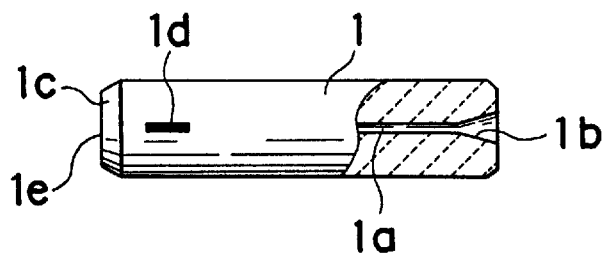

As a first example, FIGS. 4A and 4B show a simple ferrule 1, which is a circular tube having a through hole 1a to open in both ends of the ferrule to fix a optical fiber and a coned opening 1b of the hole 1a on the entrance side of the fiber.

A marker 1d is formed on the periphery of the ferrule, to indicate a direction of decentering a through hole.

In a process of producing ferrules, decentering a through hole on the top surface of the ferrule cannot be avoided, but the direction of the decentering can be easily determined for each ferrule in advance. Therefore, the direction can easily be indicated by a marker which is marked on the peripheral face of the ferrule. A plural number of ferrules are marked in the same manner, so that all the ferrules may be exchangeable in fabricating connectors.

In fabricating an optical fiber connector, a pair of ferrules are abutted on the top ends 1e and 1e in contact to each other inside the sleeve, and adjusted so as to match the two marks close to each other, thereby, obtaining minimum loss of the light transmission through the connector.

The marker may be applied on the ferrule in various ways of drawing a line, painting a color spot mark, affixing a seal, or the like. Such marker may preferably be formed of a material such as ink or paint, which is easily deleted by a solvent such as ethanol after fabricating a connector.

The marker may be formed on the end face or the chamfer or a corner of the ferrule other than the outer side surface as shown in FIG. 4B. In the figure, preferably, the marker may be formed on a portion of the ferrule which is projected from the flange member 2, excluding the portion of the which is inserted inside the sleeve. In the case of SC type ferrules, in general, markers may desirably formed on a portion on the ferrules in a distance of 5.7 mm to 8.0 mm from the top end of the ferrules.

Figure 5A:
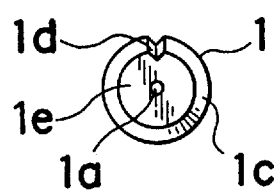
FIGS. 5A and 5B are views of a ferrule with a marker formed on a periphery, similarly to FIGS. 4A and 4B.
Figure 5B:
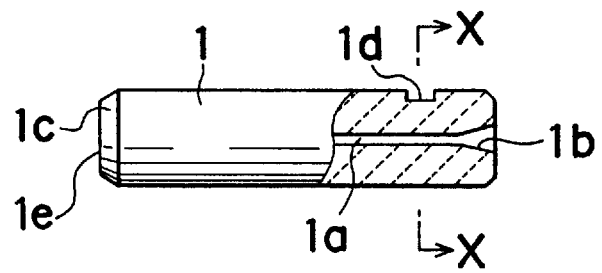
Figure 5C:
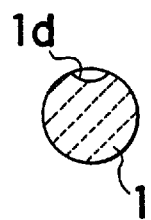
FIGS. 5C–5G show sectional views of a ferrule at the positions of X—X as indicated in FIG. 5B, which is provided with a marker on any periphery of the ferrule.
Figure 5D:
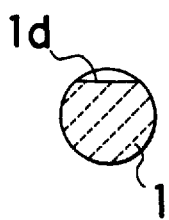
Figure 5E:
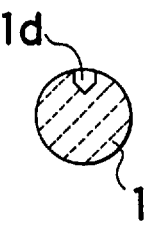
Figure 5F:
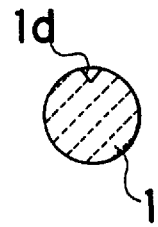
Figure 5G:
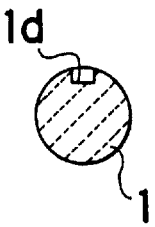

A marker may be formed by a notch or groove in the surface of the ferrule. FIG. 5A shows the notch as a maker 1d which is formed on the chamfer 1c of the ferrule 1. The position of the notch is comfortable to remove dust gathered on the top end 1e in abutting the ferrules. As another example, as shown in FIG. 5B, a short groove as a marker may be cut in the rear part of the outer periphery of the ferrule. The score on the rear side may be used for an engaging part to the flange, which is insert molded with a resin on the rear part after fabricating the two ferrules. FIGS. 5C–5g show grooves as markers having various sectional forms such as round, square, etc. on the outer periphery, as shown in X—X section in FIG. 5B.

The marker may use any other means indicative to the direction of decentering the hole, other than the above applied mark and cut notch.

Figure 6A:
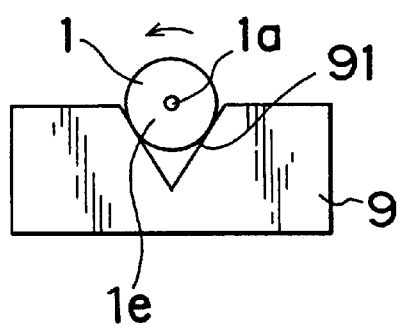
FIG. 6A shows a side view of a ferrule placed on the V notched stage for determining a direction of decentering a through hole on the top end of the ferrule.
Figure 6B:
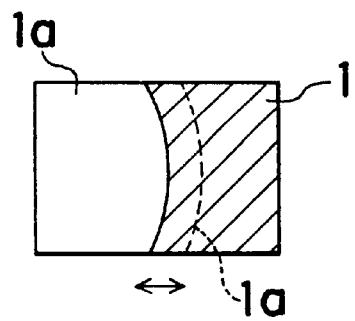
FIG. 6B shows a monitoring image elongated by microscopy in determining a direction of decentering a through hole on the top end of the ferrule.

In order to form such notch marker on a ferrule, as shown in FIG. 6A, the ferrule is placed on a V-shaped groove 21 provided on a stage 20, and the top end 1e of the ferrule is observed under a microscopic video camera while the ferrule is rotated. Then, the inner circular line of the hole 2 is moved laterally due to deviation of the hole in the image field of the video monitor, as shown in FIG. 6B. When the point of maximum deviation of the circular line is observed in the monitor, the marker is formed at a position in the direction of said deviation on the ferrule after ceasing turning the ferrule. Thus, the marker can accurately indicate the direction of decentering the through hole from the end face center of the ferrule.

As a second example, a ferrule may be provided with a flange member on rear end side, and in this case the marker indicating the direction of decentering the through hole may be formed on any periphery of the ferrule and/or the flange member. The marker my be formed by the same method as the marker applied on the surface or as a notch, as sown in the first example of this embodiment.

Particularly, the marker to be formed on the flange may be selected from notches in the periphery or projections from the periphery of the flange as shown in FIGS. 8A to 8G.

FIGS. 8A and 8B show a groove and a cut plane, respectively, FIG. 8C, a narrow and wide grooves, and FIG. 8D, a projection projected from the outer surface of a circular flange. FIGS. 8E to 8G show the markers which are formed on the sectional polygonal flange. The marker can be formed on any of the various flanges.

Thus, since the marker is formed on the ferrule and/or flange, when the two ferrules are abutted for fabrication, the mutual deviation of the optical fibers to be abutting can easily removed by matching the two markers, lowering the light loss.

Figure 7A:
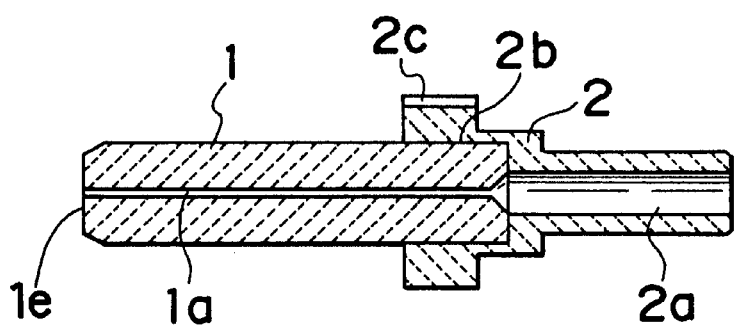
FIGS. 7A and 7B show sectional views of a ferrule with a flange member attached on the rear end.
Figure 7B:
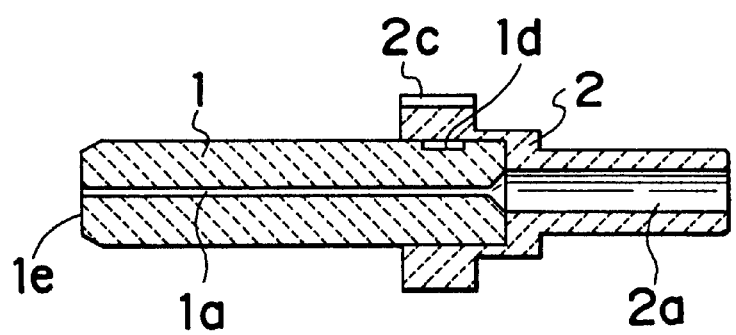

The flange may preferably comprise a metal or a resin. The flange 2 is connected to the ferrule 1, which is inserted into a hollow of the flange 2 by pressing, or is attached with an adhesive to the hollow, as shown in FIG. 7A. The flange 2 may be insertion molded of a resin around the ferrule 1 as shown in FIG. 7B. In the case of insertion molding, the ferrule is formed with a marker 1d of notch in advance, and then a part of the marker is buried in the flange in insertion molding, so that the part of the marker can be engaged in the flange.

Methods of producing the ferrule with a flange as shown in FIGS. 7A and 7B will be described below. First, the ferrule and the flange are prepared with a marker respectively, then both are joined such that the two markers are aligned closest to each other. In another method the ferrule and the flange are prepared without any marker, any one of the ferrule and flange is formed with a marker by determining the direction of decentering the through hole in the same manner as above.

In another method, the ferrule without a marker is held in a state capable of determining the direction of decentering the through hole in the same manner, then, the flange is joined to the ferrule, and thereafter the marker may be formed on said flange.

Figure 10:
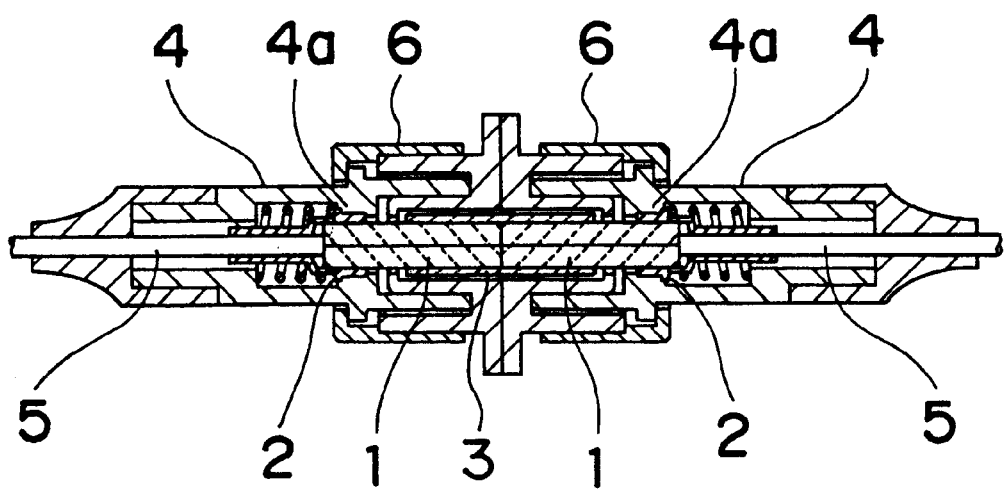
FIG. 10 shows a sectional view of the device showing in FIG. 9.

In a third example, FIGS. 9 and 10 show a pair of connector plugs 10 and 10 and an adapter 30 for an optical fiber connector. The connector plug 10 comprises a ferrule 1 with a flange 2 on the rear side, an optical fiber 5 inserted in the through hole of the ferrule 1, a plug housing 4 in which the ferrule 1 is placed in a enforced state by a spring, and a fastening member 6 such as a screw nut for outside the housing.

On the other hand, an adapter 30 comprises a sleeve 3 for inserting the ferrule 1, having a treaded portion 32a outside the sleeve.

The two ferrules 1 and 1 the connector plugs 10 and 10 are inserted into the sleeve 3 of the adapter 30 so as to abut and contact the ends of the ferrules each other, and, then, the screw nut of the fastening member 6 is engaged into the thread portion 32a of the adapter 30, completing an optical fiber connector.

In such connector, the plug housings 4 are provided on the outer surface with each projection 4b which is the above mentioned marker to has been adjusted so as to indicate the direction of decentering. In this case, both the sleeves of the adapter are formed with each slot 32a opening to the inlet of the sleeve, which slots 32a accept the projections 4b of the housing. In connecting the connector plugs 10, when the ferrules 1 and 1 are inserted into the sleeve 3 of the adapter, the projections 4b of the plug housing are inserted into the corresponding slots 32a of the adapter 30, then, aligning the two directions decentered to obtain lowest connection loss of transmission.

In this example, the ferrule with or without the marker may be used, as described in the first and second examples in this embodiment.

For example, the flange member 2 may be provided with a marker 2c on the outer surface, as shown in FIGS. 8A–8G, and the plug housing 4 may be provided with a engaging portion inside with which the marker can be engaged. Thus, the directions of decentering the through hole of the two ferrule 1 and 1 are accorded to one direction, in reference to the markers of the plug housing 4. Thereby, the two fibers 5 and 5 fixed in the through holes of the ferrules can be aligned with less displacement of two axes of the abutted top ends 1e and 1e of the fibers.

Figure 11:
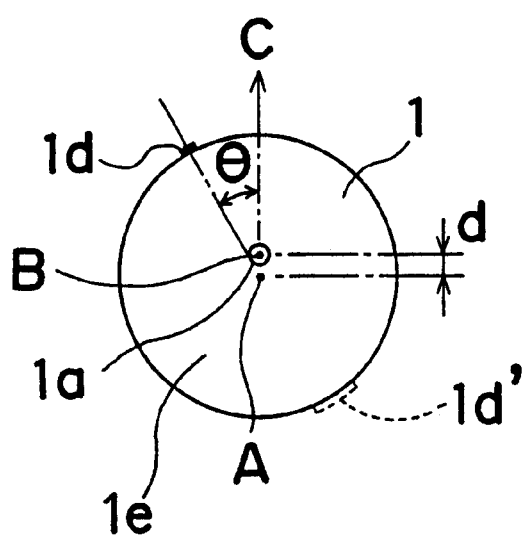
FIG. 11 shows configuration of the fiber top end and a marker in the ferrule surface.

Further, The marker 1d on the ferrule 1 may be within an angle of 30° from the direction of decentering the fiber from the real axis of the ferrule. Even in this case, the two fibers 5 and 5 through the ferrules can be aligned substantially not to displace their top feces. A surface of top end 1e of the ferrule is shown in FIG. 11. It is found that if a direction of the actual marker 1d from a center A of the ferrule 1 produces an angle of ±30° with respect to a direction C from the ferrule center A, that is, the axis of the ferrule 1 to the fiber center B, that is, the through hole center, the connector can obtain sufficient low loss of the light transmission.

Therefore, in the case of forming the marker 1d, 2c and 4d and joining a flange to the ferrule, the marker is allowed to be set within said angle of ±30° and then need not be located more precisely, facilitating the producing process.

Since the connector may be fabricated by joining or engaging a ferrule 1, a flange member 2, and a plug housing 4 one another, clearance among them and accuracy for positioning them may take place. In this case, the marker 4b indicating the direction of decentering the fiber on the plug housing may be determined in a position within the angle of ±30° from the direction of decentering the fiber in the top surface of the ferrule, by allowing for the clearance and accuracy.

For a ferrule, as shown by a doted line in FIG. 11, another marker 1d' is formed in direction diametrically opposed to the marker 1d indicating the direction of decentering a optical fiber so that the markers 1d and 1d' are distinguished each other, allowing the two markers to show the real decentring direction easily and surly.

Here, in the case of changing in an angle θ of the marker 1d to the real direction C of decentering the fiber on the top end surface, the connecting loss of light transmission can be calculated as follows;

As a comparative example, in the case of omitting adjustment of the decentring position of two ferrules with 1.4 μm in cocentricity, as shown in FIG. 11A, it cannot be known where each of the abutted top ends of the fibers to be positioned in a circular area of diameter 1.4 μm in the ferrule end surfaces, resulting in the deviation of maximum 1.4 μm between the two optical fibers.

In this case, a connecting loss L of light is represented as follows;

$$L=4.34(d/\omega)^2$$

where, d is a decentering length and ω is a spot size equal to core diameter/2×1.1=5.5 (μm).

$$L=4.34\times(1.4/5.5)^2=0.28 \text{ dB}$$

Figure 13A:
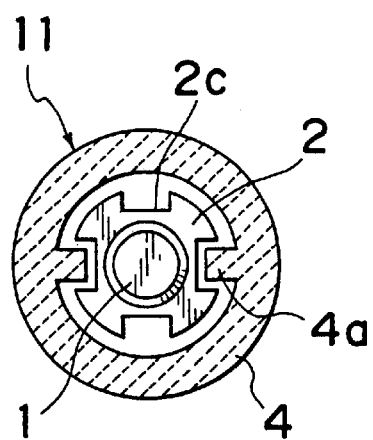
FIG. 13A shows a sectional view of a connector plug using for a optical fiber connector; and, FIG. 13B shows a side view a ferrule useful for the connector plug as shown in FIG. 13A.
Figure 13B:
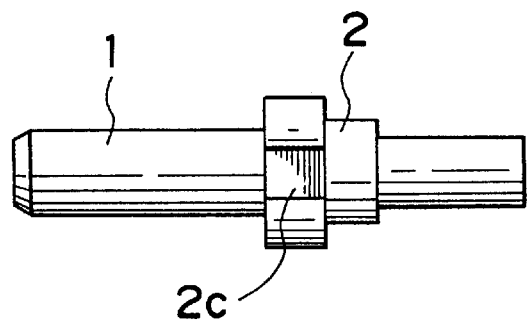

As another comparative example, in the case where the ferrules may be adjusted for every 90° by relatively turning them, using a mechanism which is shown in FIGS. 13A and 13B, the two optical fibers are located at any position in a alary area of a angle of 90° in the circle of 1.4 μm. In this case, $$d=1.4/2\times\sin 45°\times 2=0.990 \text{ } (\mu m)$$

then, maximum loss is as follows;

$$L_{max}=4.34\times(0.99/5.5)^2=0.14\text{dB}$$

Figure 12A:
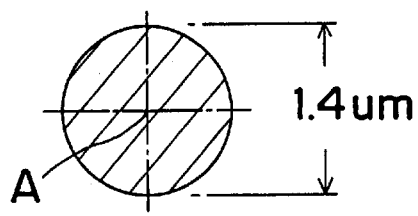
FIGS. 12A–12D show views to explain the decentering of a fiber form a center of the ferrule.
Figure 12B:
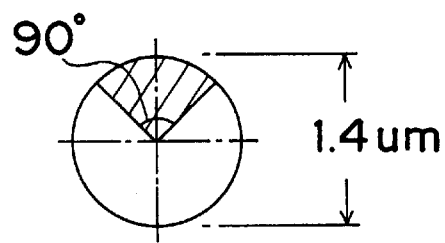
Figure 12C:
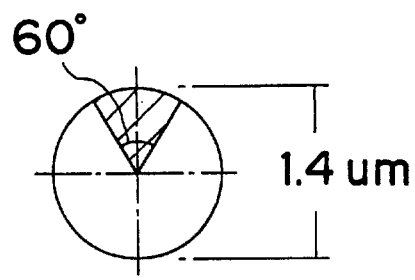

In this embodiment, however, the direction of the marker 1d from the ferrule center is limited to be within ±30° to the real direction of the decentering optical fiber, so that then the two optical fibers are located at any position in a alary area of a angle of 60° in the circle of 1.4 μm, as shown in FIG. 12C. In this case, the maximum deviation is a distance between both end sides of the alary, $$d=1.4/2\times\sin 30°\times 2=0.70 \text{ } (\mu m)$$

then, maximum loss is as follows;

$$L=4.34\times(0.70/5.5)^2=0.07 \text{ dB}$$

Further, in the case where the markers is in the real direction of decentering the fiber, the top end surfaces of the two fibers are positioned on a radial line on the ferrules, then, resulting in the maximum deviation of 0.7 μm. Then, the maximum loss of light transmission is;

$L=4.34\times(0.70/5.5)^2=0.07$ dB

The above calculated data is listed in Table 4. It is clearly found that when an angle between a direction of the marker to the ferrule center and the real direction of decentering the fiber may limited to be within, the connecting loss can be deceased in a lower level than 0.07 dB. Even when the marker direction is in the said range of the angle, the same low maximum loss can be obtained, even though the marker is not formed on the real decentering direction.

TABLE 4

Figure 12D:
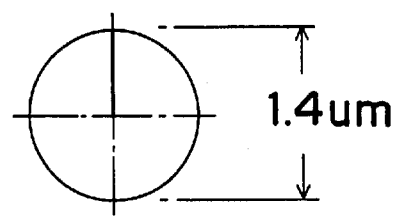

|  | angle θ of Marker to real direction decentering | corresponding figure | max, connecting. loss |
|---|---|---|---|
| comparison | No Adjusting | FIG. 12A | 0.28 |
|  | Adjusting every 90° | FIG. 12B | 0.14 |
| Example | 30° | FIG. 12C | 0.07 |
|  | 0° | FIG. 12D | 0.07 |

What is claimed is:

1. A zirconia based ceramics, containing $ZrO_2$ as a main component, 2–4 mol % of $Y_2O_3$, 0.05–1.0 wt % of $Al_2O_3$, and 0.1 wt % or less each of $SiO_2$, $TiO_2$, CaO, $Na_2O$ and $Fe_2O_3$.

2. A method of producing a zirconia based ceramic, comprising steps of:
   refining starting materials including $ZrO_2$ and $Y_2O_3$ to contain 0.1 wt % or less each of $SiO_2$, $TiO_2$, CaO, $Na_2O$ and $Fe_2O_3$;
   forming a mixture of the starting materials to a desired shape; and,
   firing the shaped material at a temperature in a range of 1300–1600° C. to obtain a sintered zirconia based ceramics which contains 0.05–1.0 wt % of $Al_2O_3$.

3. An optical connector member formed of a zirconia based ceramics, containing ZrO2 as a main component, 2–4 mol % of $Y_2O_3$, 0.05–1.0 wt % of $Al_2O_3$, and 0.1 wt % or less each of $SiO_2$, $TiO_2$, CaO, $Na_2O$ and $Fe_2O_3$.

4. An optical connector member comprising a ceramic material, wherein the ceramic material has 0.1 wt % or less of a rate of change in weight while the material is held at a temperature of 85° C. and relative humidity of 85% for 2000 hours.

5. An optical connector member according to claim 4, wherein the optical connector member is a ferrule having a through hole to hold a end portion of a fiber therein.

6. An optical connector member according to claim 4 or 5, wherein the ceramic material comprises a zirconia based ceramics which is stabilized by a stabilizer other than $Y_2O_3$ and does not substantially contain $Y_2O_3$.

7. An optical connector member according to claim 6, wherein the stabilizer is MgO or $CeO_2$ and $Dy_2O_3$.

8. An optical connector member according to claim 6, wherein the zirconia based ceramics contains 3.0–3.8 wt % of MgO and contains of 10–40 mol % of nonoclinic zirconia crystal in the ceramic structure.

9. An optical connector member according to claim 6, wherein the zirconia based ceramics contains 2.0–8.0 mol % of $CeO_2$ and 0.5–4.5 mol % of $Dy_2O_3$ with total 6.0 mol % or more of both and contains of 50 mol % or less of monoclinic zirconia crystal in the ceramic structure.

10. An optical connector member according to claim 4 or 5, wherein the ceramic material comprises a zirconia based ceramics which contains $ZrO_2$ as a main component, 2–4 mol % of $Y_2O_3$, 0.05–1.0 wt % of $Al_2O_3$, and 0.1 wt % or less each of $SiO_2$, $TiO_2$, CaO, $Na_2O$ and $Fe_2O_3$.

* * * * *

(12) EX PARTE REEXAMINATION CERTIFICATE (7483rd)
United States Patent
Kobayashi et al.

(10) Number: US 6,358,874 C1
(45) Certificate Issued: May 4, 2010

(54) ZIRCONIUM CERAMIC MATERIAL OPTICAL FIBER CONNECTOR MEMBER USING THE SAME, AND METHOD OF PRODUCING THE SAME

(75) Inventors: Yoshihiro Kobayashi, Kitami (JP); Nobuhiko Matsushita, Kitami (JP)

(73) Assignee: Kyocera Corporation, Fushimi-Ku, Kyoto-shi, Kyoto (JP)

Reexamination Request:
No. 90/007,804, Nov. 14, 2005

Reexamination Certificate for:
Patent No.: 6,358,874
Issued: Mar. 19, 2002
Appl. No.: 09/201,260
Filed: Nov. 30, 1998

(51) Int. Cl.
*C04B 35/486* (2006.01)

(52) U.S. Cl. .......................... 501/105; 385/147
(58) Field of Classification Search .................. None
See application file for complete search history.

(56) References Cited

U.S. PATENT DOCUMENTS

| 4,279,655 | A | * | 7/1981 | Garvie et al. | ................. 501/20 |
| 4,891,343 | A | * | 1/1990 | Quadair | ...................... 501/103 |
| 5,684,903 | A | * | 11/1997 | Kyomasu et al. | .............. 385/93 |
| 5,854,158 | A | * | 12/1998 | Nawa et al. | ................. 501/104 |

FOREIGN PATENT DOCUMENTS

| JP | 01262507 A | * | 10/1989 |
| JP | 02157157 A | | 6/1990 |
| JP | 03-213142 | | 9/1991 |
| JP | 06027348 A | * | 2/1994 |
| JP | 08-072767 | | 3/1994 |
| JP | 06-337327 | | 12/1994 |
| JP | 08201654 A | * | 8/1996 |
| JP | 09015452 A | | 1/1997 |
| JP | 08-201654 | | 8/1998 |

OTHER PUBLICATIONS

Teruhisa Sakamoto, "Production of Zirconia Powder and Its Powder Properties", Text of the $10^{th}$ Powder Seminar, pp. 30–40, Sep. 1986.

Toshio Fujiyoshi, "Material Database—Inorganic Material" Japan, The Nikkan Kogyo Shimbun, Ltd., Jan. 25, 1989, pp. 97 and 163.

* cited by examiner

*Primary Examiner*—Erik Kielin

(57) ABSTRACT

An optical connector member of the present invention is formed of a zirconia based ceramics which contain $ZrO_2$ as a main component, 2-4 mol % of $Y_2O_3$, 0.05-1.0 wt % of $Al_2O_3$, and [0.01] *0.1* wt % or less each of [$siO_2$] *$SiO_2$* and $TiO_2$, then allowing the connector member to assure the durability even using in the high temperature and humidity circumstances, Also, [An] *an* optical connector member is formed of a ceramic material having 0.1 wt % or less of a rate of change in weight while the material is held at a temperature of 85° C. and relative humidity of 85% for 2000 hours. For the ceramics, zirconia based ceramics are used to be partially stabilized with $Y_2O_3$ and with another stabilizer other than $Y_2O_3$. Further, the invention includes a ferrule having a through hole for holding an optical fiber therein, wherein the ferrule is provided, on its periphery, with a marker which indicates a direction of decentering the fiber on the top surface of the ferrule.

At the time of issuance and publication of this certificate, the patent remains subject to pending reissue application No. 12/139,768 filed Jun. 16, 2008. The claim content of the patent may be subsequently revised in the reissue proceeding.

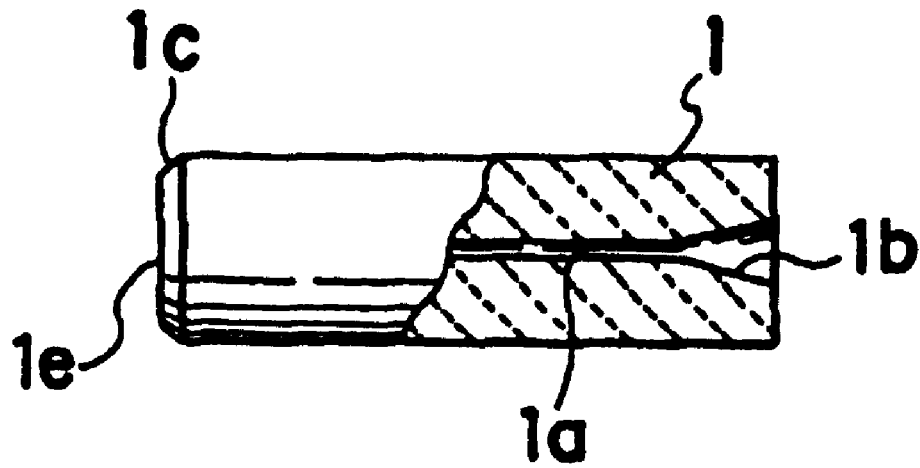

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 39–41:

In this embodiment, a zirconia based ceramics contains $Zro_2$ as a main component, 2-4 mol % of $Y_2O_3$, 0.05–1.0 wt % of $Al_2O_3$, [0.01] *0.1* wt % or less each of [$siO_2$] *$SiO_2$* and $TiO_2$.

Column 4, lines 46–54:

[$siO_2$] *$SiO_2$* and $TiO_2$ in the ceramics forms glass phase in the boundary layers between the zirconia crystal grains of the ceramics during sintering, to dissolve part of $ZrO_2$ component into the glass phase into segregation, then resulting in deteriorating the ceramics in use in above circumstances. Even any of $SiO_2$ and $TiO_2$ over 0.01 wt % can produce such glass phase. Therefore, each content of $SiO_2$ and $TiO_2$ in the sintered material should be limited to a level of [0.01] *0.1* wt % or less, to avoid such degradation.

Column 4, lines 63 through Column 5, line 3:

The present invention includes a method of producing such zirconia based ceramics. The method comprises steps preparing the starting material mixture comprising $ZrO_2$ as a main component, 2-4 mol % of $Y_2O_3$, 0.05-1.0 wt % of $Al_2O_3$, [0.01] *0.1* wt % or less each of [$siO_2$] *$SiO_2$* and $TiO_2$, pressing the mixture to a compact in a desired shape, firing the compact at a sintering temperature in a range of 1300 to 1600° C. [into a sintered body]

Column 5, lines 15–18:

An optical connector member in the present invention is formed zirconia based ceramics containing $ZrO_2$ as a main component, 2-4 mol% of $Y_2O_3$, 0.05-1.0 wt % of $Al_2O_3$, [0.01] *0.1* wt % or less each of [$siO_2$] *$SiO_2$* and $TiO_2$.

Column 8, lines 43–52:

Also, [The] *the* ceramics includes a zirconia based ceramics stabilized by $Y_2O_3$ as mentioned above in the first embodiment, containing $ZrO_2$ as a main component, 2-4 mol % of $Y_2O_3$ as stabilizer, 0.05-1.0 wt % of $Al_2O_3$, [0.01] *0.1* wt % or less each of [$siO_2$] *$SiO_2$* and $TiO_2$. In the ceramics, 2-4 mol % of $Y_2O_3$ stabilize the $ZrO_2$ crystal structure to be kept tetragonal, which is thermally stable, enhancing the long-term duration in a high temperature. The ceramics may have a structure of mean grain size of 2 μm or less and a crystal fraction of 40 mol % or less of monoclinic crystal.

AS A RESULT OF REEXAMINATION, IT HAS BEEN DETERMINED THAT:

Claims 1–10 are cancelled.

\* \* \* \* \*